United States Patent [19]

Kim

[11] Patent Number: 5,117,316

[45] Date of Patent: May 26, 1992

[54] AUTOMATIC VIDEO TAPE RUNNING MODE SETTING CIRCUIT FOR PROGRAMMED RECORDINGS

[75] Inventor: Jeong-ho Kim, Taegu, Rep. of Korea

[73] Assignee: SamSung Electronics Co., Ltd, Suwon, Rep. of Korea

[21] Appl. No.: 382,271

[22] Filed: Jul. 20, 1989

[30] Foreign Application Priority Data

Aug. 26, 1988 [KR] Rep. of Korea .................... 88-13932

[51] Int. Cl.$^5$ .............................................. G11B 15/46
[52] U.S. Cl. .................................. 360/73.07; 360/69; 360/137
[58] Field of Search ................. 360/69, 71, 137, 73.05, 360/73.06, 73.07

[56] References Cited

U.S. PATENT DOCUMENTS 4,339,776  7/1982  Langer et al. .......................... 360/69

Primary Examiner—Robert S. Tupper
Attorney, Agent, or Firm—Robert E. Bushnell

[57] ABSTRACT

An automatic video tape running mode setting circuit for programmed recordings is disclosed which comprises a programmed recording time memory means for memorizing and outputting the programmed start and end times successively for a plurality of broadcast programs set by the user; a programmed recording time detector for detecting the total programmed recording time by substracting said start time from said end time individually, and by summing up all the individual times; a recording capacity detector and a recording capacity time base data generator for detecting and generating a recording capacity time base data off the loaded video tape; and a running mode signal generator for a predetermined video tape running mode signal to a microcomputer for controlling the operation of the whole system.

15 Claims, 4 Drawing Sheets

FIG. 5

| SWITCH / Rec.Cap. | 32A | 32B | 32C |
|---|---|---|---|
| 30 MINUTES | OPEN | OPEN | OPEN |
| 60 MINUTES | CLOSED | OPEN | OPEN |
| 90 MINUTES | OPEN | CLOSED | OPEN |
| 120 MINUTES | CLOSED | CLOSED | OPEN |
| 180 MINUTES | OPEN | OPEN | CLOSED |
| 240 MINUTES | CLOSED | OPEN | CLOSED |

AUTOMATIC VIDEO TAPE RUNNING MODE SETTING CIRCUIT FOR PROGRAMMED RECORDINGS

FIELD OF THE INVENTION

The present invention relates to an automatic video tape running mode setting circuit for programmed recordings, which is capable of detecting the recording time and the video tape capacity to automatically set an SP (Standard Play) mode, an LP (Long Play) mode or an SLP (Super Long Play) mode, in the case where a video tape recorder has programmed recording capabilities.

BACKGROUND OF THE INVENTION

Generally, in the case where a video tape recorder is made to perform a programmed recording for a certain broadcast program, the user has to control the running mode switch to set the running mode of the video tape recorder. However, users are generally used to pre-register the start and end time of the broadcast program and to forget the setting of the video tape running mode, while the running mode of the video tape is usually set to an SP mode.

However, in carrying out a programmed recording with the video tape running mode set to an SP mode, if the recording capacity of the video tape is larger than the programmed recording time of the broadcast program to be recorded, the whole program can be well recorded. On the other hand, if the programmed recording time is larger than the recording capacity of the video tape, the posterior content of the broadcast program will fail to be recorded due to the insufficiency of the video tape.

SUMMARY OF THE INVENTION

Therefore it is the object of the present invention to provide an automatic video tape running mode setting circuit for programmed recordings, which is capable of comparing the total programmed recording time with the recording capacity of the video tape loaded in the deck, and automatically setting the running mode to an SP mode, LP mode or SLP mode, so that the trouble of manually setting the video tape running mode by the user is removed, and that the failure of recording for the posterior content of the program can be prevented.

In achieving the above object, the automatic running mode setting circuit according to the present invention comprises a programmed recording time memory means for memorizing the programmed recording start and end times successively for a plurality of broadcast programs set by the user; a programmed recording time detector for detecting the whole programmed recording time for the programs to be recorded by subtracting the start time from the end time to calculate each programmed recording time per broadcast program, and by adding all such recording times to obtain the total programmed recording time for all the programs; a recording capacity detector for detecting the recording capacity of the video tape loaded in the deck; a recording capacity time base data generator for generating the time base data corresponding to the recording capacity detected by the recording capacity detector; and a running mode signal generator for generating and transmitting a video tape running mode signal to a microcomputer which controls the operation of the whole system by comparing the output signals of the programmed recording time detector and the recording capacity time base data generator.

The automatic running mode setting circuit according to the present invention as described above will be operated as described below. If the user sets the programmed recording start and end times for the desired broadcast program, then the programmed recording time memory means will memorize and output the programmed recording start and end times for plural programs to be registered successively. Thus, if the start and end times are outputted, the programmed recording time detector will calculate the programmed recording time by subtracting the programmed recording start time from the programmed recording end time, and will add all such calculation results to obtain the total programmed recording time for all the programs registered.

Meanwhile, the recording capacity detector will detect the recording capacity of the video tape which the user has loaded into the deck in order to carry out a programmed recording. Then the recording capacity time base data generator will generate the time base data corresponding to the detected recording capacity and the doubled time base data together. Further, the running mode signal generator will compare the recording capacity time base data outputted by the recording capacity time base data generator and the total programmed recording time outputted by the programmed recording time detector, and thereby generate the predetermined video tape running mode signal such as an SP mode signal, an LP mode signal, or an SLP mode signal to be applied too a microcomputer.

BRIEF DESCRIPTION OF THE DRAWINGS

The above object and other advantages of the present invention will become more apparent by describing the preferred embodiment of the present invention in more detail with reference to the attached drawings in which:

FIG. 5 is a table showing the operating states of the detecting switch for different recording capacities of several video tapes loaded in the deck, according to the present invention.

DESCRIPTION OF THE PREFERRED EMBODIMENT

Figure 1:
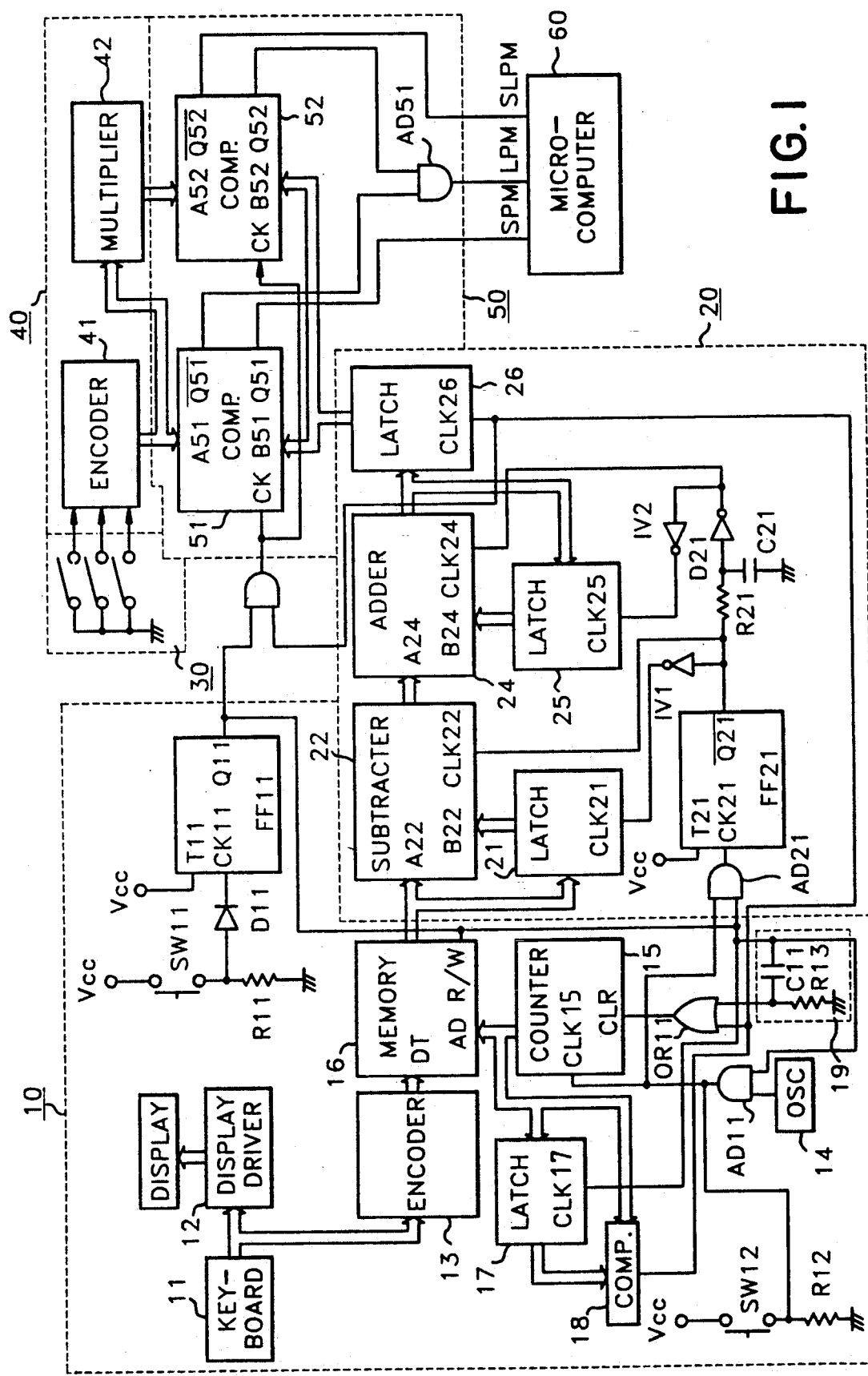
FIG. 1 illustrates the automatic running mode setting circuit according to the present invention.

FIG. 1 illustrates the automatic running mode setting circuit according to the present invention. As shown in this drawing, the circuit according to the present invention comprises a programmed recording time memory means 10 for memorizing and outputting the programmed recording start and end times successively for a plurality of broadcast programs chosen by the user; a programmed recording time detector 20 for detecting the whole programmed recording time for plural broadcast programs by subtracting the start time from the end time outputted from the programmed recording time memory means 10 for each of the programs to calculate each programmed recording time, and by adding all such recording times to obtain the total programmed recording time for all the programs; a recording capacity detector 30 for detecting the recording capacity of the video tape loaded in the deck; a recording capacity time base data generator 40 for outputting the recording capacity time base data corresponding to the recording capacity detected by the recording capacity detector 30; and a running mode signal generator 50 for outputting a video tape running mode signal toward a microcomputer 60 which controls the operation of the whole system by comparing both output signals of the programmed recording time detector 20 and the recording capacity time base data generator 40.

The programmed recording time memory means 10 consists of a display driver 12 for driving the output signal of a key board 11 to be displayed at a display unit DIS; an encoder 13 for encoding the output signal of the key board 11 to generate the programmed recording start time signals and the programmed recording end time signals; a flip-flop FF11 for being toggled upon pressing of a time switch SW11; an AND gate AD11 for logically multiplying output signals of the flip-flop FF11 and an oscillator 14; a counter 15 for counting the output signals of the AND gate AD11 or the number of pressings of a program check switch SW12; a memory 16 for performing read/write operations in correspondence with the output signals of the flip-flop FF11, and for storing and outputting the output signals of the encoder 13 to and from the addresses designated by the signals of the counter 15; a latch 17 for storing output signals of the counter 15 in response to the output signals of the flip-flop FF11; a comparator 18 for comparing the output signals of the counter 15 and the latch 17 for confirming their equivalence; a differentiator 19 composed of a condenser C11 and a resistance R13, and for differentiating the output signals of the flip-flop FF11; and a OR gate OR11 for logically adding the output signals of the comparator 18 and the differentiator 19, and for clearing the counter 15.

The programmed recording time detector 20 consists of an AND gate AD21 for logically multiplying output signals of the flip-flop FF11 and the AND gate AD11, or for logically multiplying the output signals of the flip-flop FF11 and the number of pressings of the program check switch SW12 of the programmed recording time memory means 10; a flip-flop FF21 for being toggled in response to the output signal of the AND gate AD21; a latch 21 for storing and outputting the output signals of the memory 16 of the programmed recording time memory means 10 in response to the output signals of the flip-flop FF21; a subtractor 22 for subtracting the output signals of the latch 21 from the output signals of the memory 16; a delayer 23 composed of a resistance R21, a condenser C21 and a diode D21, and for delaying the output signals of the flip-flop FF21 for a predetermined period of time; an adder 24 for adding the output signals of the subtractor 22 and the output signals of the later-mentioned latch 25 in response to the output signals of the delayer 23; a latch 25 for latching the output signals of the adder 24 in response to the output signals of the delayer 23, and for inputting the signals again to the adder 24; and a latch 26 for storing and outputting the output signals of the adder 24 in response to the output signals of the comparator 18 of the programmed recording time memory means 10.

Figure 2A:
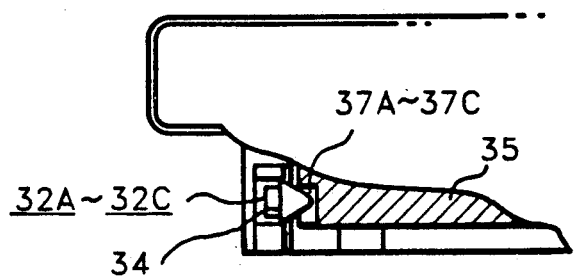
FIGS. 2(A) and 2(B) are respectively a partly cut-out side view and a rear view showing a deck portion having a video tape recording capacity detecting switch for use in the automatic running mode setting circuit according to the present invention.
Figure 2B:
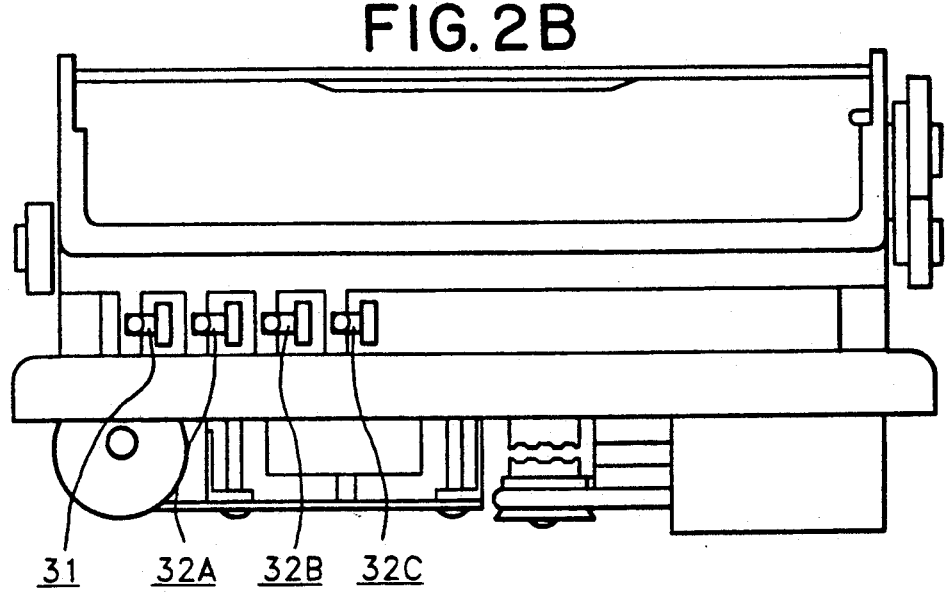
Figure 3:
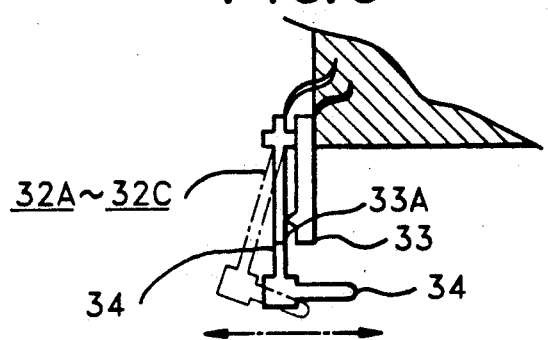
FIG. 3 is an enlarged schematic diagram illustrating the operation of a recording capacity detecting switch adopted in the automatic running mode setting circuit according to the present invention.

As shown in FIGS. 2 and 3, the recording capacity detector 30 is provided with a plurality of recording capacity detecting switches 32A-32C which respectively consist of a fixed piece 33 having a fixed contact 33A and a movable piece 34 having an actuation rod 34A, the recording capacity detecting switches 32A-32C being installed in parallel at certain intervals. Beside the switch 32A, there is installed a erroneous erasing prevention switch 31.

As shown in FIGS. 4(A)–4(F), a erroneous erasing prevention groove 36 is provided on the video tape 35, while a certain number of recording capacity detecting grooves 37A-37C are provided beside the erroneous erasing prevention groove 36 in correspondence with switches 32A-32C, the number of the grooves 37A-37C being decided depending on the recording capacity of the video tape 35. That is, in the case of a 30 minutes tape, there is provided no grooves 37A-37C, while in the cases of 60, 90, 120, 180 and 240 minutes tapes, the groove 37A, the groove 37B, the grooves 37A and 37B, the groove 37C and the grooves 37A and 37C are provided respectively, so that, when the video tape is loaded into the deck, the switches 32A-32C should be selectively opened or closed as shown in FIG. 5.

The recording capacity time base data generator 40 consists of an encoder 41 for encoding the output signals of the recording capacity detector 30 to output the recording capacity time base data, and a multiplier 42 for multiplying two (2) by the time base data from the encoder 41.

The running mode signal generator 50 consists of a comparator 51 for performing a comparison as to whether the output signals of the encoder 41 of the recording capacity time base data generator 40 are larger than the output signals of the latch 26 in the programmed recording time detector 20, and for outputting an standard play mode signal SPM through a non-inverting output terminal Q51; a comparator 52 for performing a comparison as to whether the output signals of the multiplier 42 of the recording capacity time base data generator 40 are larger than or equal to the output signals of the latch 26, and for outputting an super long play mode signal SLPM through an inverting output terminal $\overline{Q52}$; and an AND gate AD51 for logically multiplying the output signals of the inverting output terminal $\overline{Q51}$ of the comparator 51 and the non-inverting output terminal Q52 of the comparator 52 in order to output a long play mode signal LPM.

In the circuit according to the present invention constituted as described above, on the condition that the power voltage Vcc is applied to the circuit, when plural broadcast programs programmed recordings are to be registered in the video tape recorder, the output terminal Q11 of the flip-flop FF11 will output a low level signal, and therefore, the outputted low level signal will be applied to a read/write terminal R/$\overline{W}$ of the memory 16, so that the memory 16 should be able to perform writing operations.

Under this condition, if the user presses the program check switch SW12, the power voltage Vcc will be applied through the switch SW12 to a clock terminal CLK15 of the counter 15, and therefore, the counter 15 will perform a counting to supply the counted result to an address port AD of the memory 16, thereby designating the address of the memory where the programmed recording start time for the first program is to be stored.

Under this condition, if the user feeds the programmed recording start time for the first program by means of a key board 11, the start time will be inputted into the display driver 12 to be displayed on the display unit DIS. At the same time, the start time will be encoded by the encoder 13, so that the encoded data should be fed into a data input port DT of the memory 16, and that the memory 16 should store the programmed recording start time of the first program into the address designated by the output signal of the counter 15.

Successively, if the user presses again the switch SW12, the counter 15 will perform count operations to designate the address of the memory where the programmed recording end time for the first program is to be stored. Then, if the programmed recording end time for the first program is fed through the key board 11, the end time will be displayed to the display unit DIS through the display driver 12, and at the same time, will be stored through the encoder 13 to the memory 16.

Thus, if the switch SW12 is repeatedly pushed, the counter 15 will perform count operations for the number of pushings of the switch SW12, and at the same time, the addresses will be successively designated where the start and end times of the first program, the start and end times of the second program and so on are to be respectively stored, while the start and end times of the first program, the start and end times of the second program and so on can be stored into the respective addresses through manipulations of the key on the key board 11.

Thus, upon completion of the time setting of the broadcast program for a programmed recording, if the switch SW11 is pushed, the flip-flop FF11 will be toggled to output a high level signal through its output terminal Q11. The high level output signal will be supplied to the read/write terminal R/$\overline{W}$, to the clock terminal CLK17 of the latch 17, to the one of the input terminals of the AND gate AD11, and to the differentiator 19. Therefore, the memory will be enabled to perform reading operations, and the latch 17 will store and output the output signals of the counter 15. That is, the latch 17 will store and output the last address of the programs, which is stored in the memory, while the differentiator 19 will output a high level differentiation signal to pass it through the OR gate OR11 to a clear terminal CLR of the counter 15. Accordingly, the counter 15 will be cleared, and the AND gate AD11 will output an oscillating signal after receipt of the signal from the oscillator 14 through its input terminal.

If a first oscillating signal is generated from the oscillator 14, the outputted signal is supplied through the AND gate AD11 to the clock terminal of the the counter 15, so that the counter 15 should be able to count the outputted oscillating signals, and that the address of the memory 16 storing the start time of the programmed recording for the first program will be designated. Therefore, the memory 16 will output the programmed recording start time for the first program. Upon generation of a second oscillating signal by the oscillator 14, the counter 15 will designate the next address in the memory 16, so that the memory 16 should be able to output the programmed recording end time for the first program.

Thus, if the oscillating signals are generated from the oscillator 14, the counter 15 will count the oscillating signals, and at the same time, will designate the addresses in the memory 16 successively, so that the memory 16 should be able to successively output from its stored start and end times of the first program, the start and end times of the second program and so on.

Through the above procedure, if the last address for the programmed recording start and end times in the memory 16 is designated by the counter 15, the memory 16 will output the last programmed recording start and end times, and then, the output signals of the counter 15 and the latch 17 will become same each other. Therefore, the comparator 18 will output a high level signal through the output terminal Q18, and the outputted high level signal will be applied through the OR gate OR11 to the clear terminal CLR of the counter, so that the counter should be cleared.

As a result, the programmed recording time memory means 10, upon pushing of the switch SW12 by the user, will store into the designated memory addresses the programmed recording start and end times of the first program, the programmed recording start and end times of the second program, and so on as inputted through the key board. If the time inputting of broadcast programs is completed, the memory 16 will output successively the programmed recording start and end times of the first program, the programmed recording start and end times of the second program and so on in response to the oscillating signals of the oscillator 14.

The programmed recording time detector 20 is operated as described below. If a first oscillating signal is outputted by the oscillator 14, the outputted oscillating signal will be supplied through the AND gates AD11 and AD21 to the clock terminal CK21 of the flip-flop FF21, and therefore, the flip-flop FF21 will be toggled to output a low level signal through its output terminal $\overline{Q21}$. As the output signal Q21 of low level is converted into the high level signal by an inverter IV1 and is applied to a clock terminal CLK21 of a latch 21. Then the programmed recording start time for the first program as outputted from the memory 16 in response to the first oscillating signal of the oscillator 14 will be inputted into the latch 21.

Under this condition, if a second oscillating signal is outputted from the oscillator 14, then the flip-flop FF21 will be toggled to output a high level signal through the output terminal $\overline{Q21}$, and the outputted high level signal will be inputted as the clock signal into the clock terminal CLK22 of the subtractor 22. Therefore, according to the second oscillation signal from the latch 21, the memory 16 will output the programmed recording end time for the first program to supply it to the input port A22 of the subtractor 22, so that the subtractor 22 should be able to output the programmed recording time for the first program by subtracting the programmed recording start time from the programmed end time. Thus, in response to the oscillating signals from the oscillator 14, the programmed recording start times for the first program, the second program and so on as outputted from the memory 16 are subtracted from the programmed recording end times for the first program, the second program and so on as outputted from the memory 16, in order to ultimately successively output the programmed recording times for the first program, the second program and so on.

The programmed recording times for the first program, the second program and so on as outputted from the subtractor 22 are inputted into the input port A24 of the adder 24 in response to the first oscillating signal. While the high level signal outputted from the output terminal Q21 of the flip-flop FF21, which is occurred in response to the second oscillating signal, will be delayed for a predetermined period of time by the delayer 23, and then, supplied to the clock terminal CLK25 of the latch 25. According to the third oscillating signal, the output terminal $\overline{Q21}$ of the flip-flop FF21 is to generate the low level signal, which makes the latch 25 inoperative, and in turn, is converted to a high level signal by an inverted IV2. The high level signal from the inverter IV2 is applied to the clock terminal CLK24 of the adder 24 so that the adder 24 should be able to combine the programmed recording times from the input terminals A24 and B24 to generate the summed-up time. As for the repeated operations, the adder 24 can generate the sum of the respective programmed recording times of the first, the second broadcast program and so on.

Thus after the programmed recording end time for the last program is outputted from the memory 16 where it is stored, thereby completing the outputting of the total programmed recording time for all the programs, the comparator 18 will generate an output signal of high level. The high level output signal will be applied to the clock terminal CLK26 of the latch 26, and therefore, the latch 26 will store and output the total programmed recording time, with the result that the outputted time data will be inputted into input terminals B51, B52 of the comparator 51, 52 of within the running mode signal generator 50.

This is, the programmed recording time detector 20 will subtract the programmed recording start times from the programmed recording end times for all the programs by means of the subtractor 22, thereby detecting the programmed recording times for the respective programs. The detector 20 also adds the respective programmed recording times by means of the adder 24 to obtain the total programmed recording time for all the programs, and then, it outputs a signal for the whole programmed recording time to input it into the comparator 51, 52.

Figure 4A:
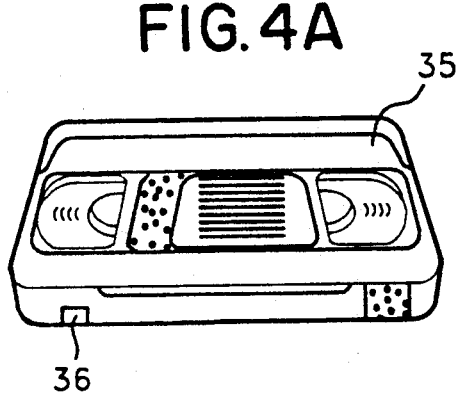
FIGS. 4A to 4F are perspective views of several video tapes provided with detecting grooves for different recording capacities, which are operatively engaged with the recording capacity detecting switch shown in FIG. 3.
Figure 4D:
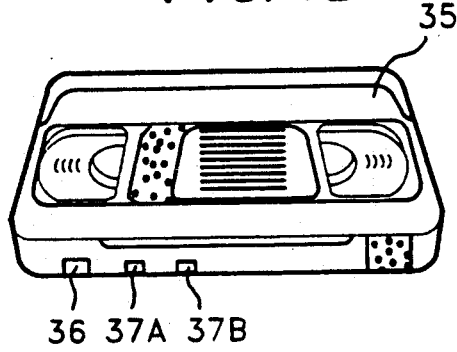

Meanwhile, if the video tape 35 for a programmed recording is loaded into the deck, the recording capacity detecting switches 32A–32C are selectively open or closed. That is, as shown in FIG. 4A, if a video tape 35 of 30 minutes recording capacity having no recording capacity detecting grooves 37A–37C is loaded in the deck, the back side of the video tape 35 will push the actuation rod 34A, and therefore, the moveable piece 34 will be separated from the fixed contact 33A of the fixed piece 33, thereby opening all the switches 32A–32C.

Figure 4B:
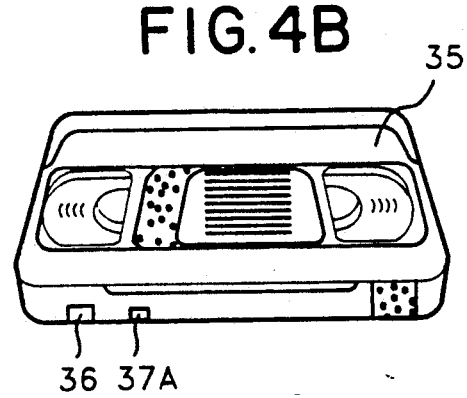
Figure 4E:
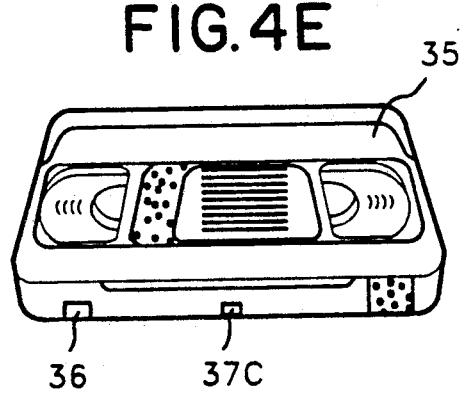
Figure 4C:
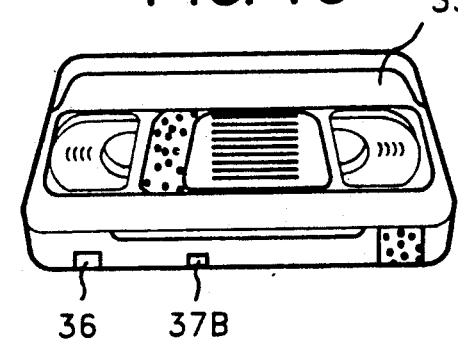
Figure 4F:
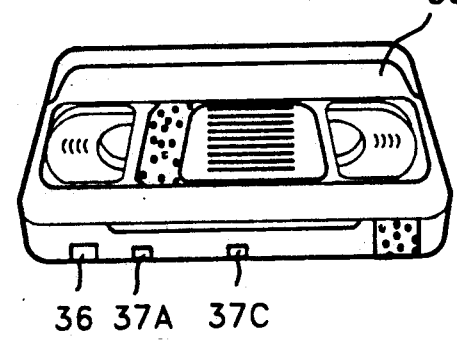

If a video tape 35 of 60 minutes capacity having the detecting groove 37A as shown in FIG. 4B is loaded, the actuation rod 34A of the switch 32A will be inserted into the groove 37A, and therefore, the movable piece 34 will be kept in contact with the fixed contact 33A of the fixed piece 33, thereby closing only the switch 32A.

If video tapes having respectively 90 minutes, 120 minutes, 180 minutes, and 240 minutes as shown in FIGS. 4C to 4F are loaded into the deck, the switches 32A–32C will be selectively closed or open in accordance with the recording capacities of the video tapes.

Further, in accordance with the selective closing or opening of the switches 32A–32C, these switching signals will be encoded by the encoder 41 to output the recording capacity. The outputted recording capacity time base data will be inputted into the input port A51 of the comparator 51, and at the same time, will be multiplied to twice by the multiplier 42 so as for it to be inputted into the input port A52 of the comparator 52. Therefore, the comparators 51,52 will respectively compare the recording capacity time base data with the total programmed recording time, and the multiplied-to-twice recording capacity time base data with the total programmed recording time, and will selectively output high level signals through the output terminals $\overline{Q51}$, Q51, Q52, $\overline{Q52}$, with the result that a standard play mode signal SPM, a long play mode signal LPM, or a super long play mode signal SLPM will be inputted into the microcomputer 60.

For example, upon loading a video tape having a capacity of 120 minutes into the deck, the recording capacity time base data will be inputted into the input port A51 of the comparator 51, and at the same time, will be multiplied to 240 minutes to be inputted into the input port A52 of the comparator 52. If the total programmed recording time is smaller than 120 minutes, high signal will be outputted through the output terminal Q51 of the comparator 51, with the result that a standard play mode signal SPM will be inputted into the microcomputer 60. If the total programmed recording time is more than 120 minutes and less than 240 minutes, then the comparators 51, 52 will output high potentials through their output terminals $\overline{Q51}$, Q52, so that a long play mode signal LPM should be inputted through the AND gate AD51 to the microcomputer 60. If the total programmed recording time is over 240 minutes, the comparator 52 will output a high potential through its output terminal $\overline{Q52}$, so that a super long play mode signal SLPM should be inputted into the microcomputer 60.

The running mode signal generator 50 will compare the total programmed recording time for all the programs with the recording capacity time base data of the video tape 35 loaded in the deck. If the total programmed recording time is shorter than the recording capacity time base data, then the running mode signal generator 50 will output a standard play mode signal SPM. If the total programmed recording time is longer than the recording capacity time base data and is shorter than twice the recording capacity time base data, it will output a long play mode signal LPM. While, if the total programmed recording time is longer than twice the recording capacity time base data, it will output a super long play mode signal. In accordance with the mode signal SPM, LPM, or SLPM outputted as described above, the microcomputer 60 will drive the video tape in standard play, long play, or super long play mode upon arrival of the programmed time to carry out the programmed recordings.

As described above in detail, the circuit according to the present invention, in performing a programmed recording, compares the total program recording time for all the programs with the recording capacity of the video tape in order to set the running mode automatically, and therefore, not only the troublesome task of manually shifting the running mode switches by the user is eliminated, but also the failure of recording of the trailing portion of the program due to the insufficiency of the capacity of the video tape can be prevented.

What is claimed is:
1. An automatic video tape running mode setting circuit for programmed recordings, comprising:
programmed recording time memory means for memorizing and outputting programmed recording start and end times successively for a plurality of programs set by a user;

a programmed recording time detector for providing output signals by detecting the total programmed recording time for all the programs by subtracting the start time from the end time outputted from said programmed recording time memory means for each of the programs to calculate each programmed recording time, and by adding all such programmed recording times to obtain the total programmed recording time for all the programs;

a recording capacity detector for detecting recording capacity of the video tape, said video tape being housed in a cassette loaded in a deck;

a recording capacity time base data generator for generating time base data corresponding to the recording capacity detected by said recording capacity detector; and a running mode signal generator for generating and transmitting a video tape running mode signal to a microcomputer, said microcomputer controlling the operation of the whole system by comparing the output signals of the programmed recording time detector and the recording capacity time base data generator.

2. The automatic video tape running mode setting circuit for programmed recordings according to claim 1, wherein said programmed recording time memory means comprises:

a display driver for driving an output signal of a keyboard to be displayed at a display unit;

a first encoder for encoding the output signal of the keyboard to generate said programmed recording start time signals and said programmed recording end time signals;

a first flip-flop for being toggled upon pressing of a time switch;

a first AND gate for logically multiplying output signals of said first flip-flop and an oscillator;

a counter for counting output signals of said first AND gate or the number of pressings of a program check switch;

a memory for performing read/write operations in correspondence with the output signals of said first flip-flop, and for storing and outputting the output signals of said first encoder to and from addresses designated by output signals of said counter;

a first latch for storing output signals of said counter in response to the output signals of said first flip-flop;

a first comparator for comparing the output signals of said counter and output signals of said first latch for confirming equivalence;

a differentiator for differentiating the output signals of said first flip-flop; and an OR gate for logically adding output signals of said first comparator and said differentiator, and for clearing said counter.

3. The automatic video tape running mode setting circuit for programmed recordings according to claim 2, wherein said programmed recording time detector comprises:

a second AND gate for logically multiplying output signals of said first flip-flop and said first AND gate, or for logically multiplying the output signals of said first flip-flop and the number of pressings of said program check switch of said programmed recording time memory means;

a second flip-flop being toggled in response to the output signal of said second AND gate;

a second latch storing and outputting the output signals of said memory of said programmed recording time memory means in response to the output signals of said second flip-flop;

a subtractor subtracting the output signals of said second latch from the output signals of said memory;

a delayer connected to delay the output signals of said second flip-flop for a predetermined period of time;

an adder for adding output signals of said subtractor and output signals of a third latch in response to output signals of said delayer;

said third latch for latching output signals of said adder in response to the output signals of said delayer, and for inputting the latched signals again to said adder; and a fourth latch for storing and outputting the output signals of said adder in response to the output signals of said first comparator of said programmed recording time memory means.

4. The automatic video tape running mode setting circuit for programmed recordings according to claim 1, wherein said recording capacity decoder includes a plurality of recording capacity detecting switches installed at certain intervals beside an erroneous erasing prevention switch, and also includes first, second and third recording capacity detecting grooves at a position on said cassette housing the tape corresponding to said recording capacity detecting switches, said first, second and third recording capacity detecting grooves being selectively provided in such a manner that, if the recording capacity of the video tape is 30 minutes, no grooves are provided, and if the recording capacities are 60 minutes, 90 minutes, 120 minutes, 180 minutes or 240 minutes, then the first groove, the second groove, the first and second grooves, the third groove or the first and third grooves are respectively provided, so that corresponding ones of said plurality of recording capacity detecting switches are selectively closed.

5. The automatic video tape running mode setting circuit for programmed recordings according to claim 3, wherein said recording capacity time base data generator comprises:

a second encoder for encoding the output signals of said recording capacity detector and for outputting the recording capacity time base data; and a multiplier for multiplying by two the output signals of said second encoder.

6. The automatic video tape running mode setting circuit for programmed recordings according to claim 5, wherein said running mode signal generator comprises:

a second comparator for performing a comparison as to whether the output signals of said second encoder of said recording capacity time base data generator are larger than the output signals of said fourth latch of said programmed recording time detector, and for outputting a standard play mode signal SPM through a non-inverting output terminal of said second comparator;

a third comparator for performing a comparison as to whether the output signals of said multiplier of said recording capacity time base data generator are larger than or equal to the output signals of said fourth latch, and for outputting a super long play mode signal SLPM through an inverting output terminal of said third comparator; and a third AND gate for logically multiplying the output signals of a non-inverting output terminal of said third comparator and an inverting output terminal of said second comparator in order to output a long play mode signal LPM.

7. An automatic video tape running mode setting circuit for programmed recordings, comprising:
first means for memorizing and outputting programmed recording start and end times successively for a plurality of programs set by a user;
second means for detecting total programmed recording time for all of the programs by substracting start time from end time for each of the programs to calculate each programmed recording time, and for adding each calculated programmed recording time for providing said total programmed recording time as a first output signal;
third means for detecting recording capacity of the video tape, said video tape being housed in a cassette loaded in a deck;
fourth means for generating as a second output signal time base data corresponding to the detected recording capacity; and
fifth means for generating a video tape running mode signal by comparing the output signals of the recording time detector and the recording capacity time base data generator, and for transmitting said video tape running mode signal to a microcomputer;
said microcomputer for controlling a video tape recording speed in response to said video tape running mode signal.

8. The automatic video tape running mode setting circuit for programmed recordings according to claim 7, wherein said first means comprises:
a display driver for driving an output signal of a keyboard;
a first encoder for encoding the output signal of the keyboard to generate said programmed recording start time signals and said programmed recording end time signals;
a first flip-flop for being toggled upon pressing of a time switch;
a first AND gate for logically multiplying output signals of said flip-flop and oscillator;
a counter for counting output signals of said first AND gate or each pressing of a program check switch;
a memory for performing read/write operations in correspondence with output signals of said first flip-flop, and for storing and outputting the output signals of said first encoder to and from addresses designated by output signals of said counter;
a first latch for storing the output signals of said counter in response to the output signals of said first flip-flop;
a first comparator for comparing the output signals of said counter and output signals of said first latch for confirming their equivalence;
a differentiator for differentiating the output signals of said first flip-flop; and
an OR gate for logically adding output signals of said first comparator and said differentiator, and for clearing said counter.

9. The automatic video tape running mode setting circuit for programmed recordings according to claim 8, wherein said second means comprises:
a second AND gate for logically multiplying output signals of said first flip-flop and said first AND gate, or for logically multiplying the output signals of said first flip-flop and each of the pressings of said program check switch;
a second flip-flop toggled in response to an output signal of said second AND gate;
a second latch for storing and outputting the output signal of said memory in response to output signals of said second flip-flop;
a subtractor for subtracting the output signals of said second latch from the output signals of said memory;
a delayer for delaying the output signals of said second flip-flop for a predetermined period of time;
an adder for adding output signals of said subtractor and output signals of a third latch in response to output signals of said delayer;
said third latch for latching the output signals of said adder in response to the output signals of said delayer, and for inputting the latched output signals of said adder again to said adder; and
a fourth latch for storing and outputting the output signals of said adder in response to the output signals of said first comparator.

10. The automatic video tape running mode setting circuit for programmed recordings according to claim 7, wherein said third means comprises:
a plurality of recording capacity detecting switches installed at certain intervals beside an erroneous erasing prevention switch; and
a plurality of recording capacity detecting grooves, at a position on said cassette housing the tape, corresponding to said recording capacity detecting switches, said recording capacity detecting grooves being selectively provided in such a manner that, if the recording capacity of the video tape is 30 minutes, no grooves are provided, and if the recording capacities are one of 60 minutes, 90 minutes, 120 minutes, 180 minutes or 240 minutes, then a plurality of grooves are respectively provided, so that the recording capacity detecting switches may be selectively closed or opened according to said recording capacities.

11. The automatic video tape running mode setting circuit for programmed recordings according to claim 9, wherein said fourth means comprises:
a second encoder for encoding signals indicating recording capacity of video tapes and for generating recording capacity time base data; and
a multiplier for multiplying output signals of said second encoder.

12. The automatic video tape running mode setting circuit for programmed recordings according to claim 11, wherein said fifth means comprises:
a second comparator for performing a comparison of whether the second output signal of said fourth means is larger than the first output signal of said second means, and for outputting a standard play mode signal;
a third comparator for performing a comparison of whether an output signal of said multiplier of said fourth means is larger than or equal to the first output signal of said second means for providing a super long play mode signal; and an AND gate for logically multiplying an inverted standard play mode signal from said second comparator and an inverted super long play mode signal from said third comparator to provide a long play mode signal;

wherein one of said standard play mode, super long play mode or long play mode signals is provided to said microcomputer as said video tape running mode signal.

13. An automatic video tape running mode setting method for programmed recordings, comprising the steps of:

memorizing and outputting programmed recording start and end times successively for a plurality of programs set by a user;

detecting total programmed recording time for all the programs and providing said total programmed recording time as a first output signal;

detecting recording capacity of the video tape, said video tape being housed in a cassette loaded in a deck;

generating as a second output signal time base data corresponding to the detected recording capacity;

generating a video tape running mode signal by comparing the first and second output signals, and controlling a video tape recording speed in response to said video tape running mode signal.

14. An automatic video tape running mode setting circuit, comprising:

first means for memorizing and outputting programmed recording start and end times successively for a plurality of programs set by a user;

second means for detecting total programmed recording time for all of the programs by subtracting start time from end time for each of the programs to calculate each programmed recording time, and for adding calculated programmed recording time for providing said total programmed recording time as a first output signal;

third means for detecting recording capacity of the video tape, said video tape being housed in a cassette loaded in a deck;

fourth means for generating as a second output signal time base data corresponding to the detected recording capacity; and fifth means for generating a video tape running mode signal by comparing the output signals of the recording time detector and the recording capacity time base data generator.

15. A process for automatically setting video tape running mode for programmed recordings, comprising:

first means for memorizing and outputting programmed recording start and end times successively for a plurality of programs set by a user;

second means for detecting total programmed recording time for all of the programs by substracting start time from end time for each of the programs to calculate each programmed recording time;

adding each calculated programmed recording time for providing said total programmed recording time as a first output signal;

detecting recording capacity of the video tape, said video tape being housed in a cassette loaded into a deck;

generating as a second output signal, time base data corresponding to the detected recording capacity;

generating a video tape running mode signal by comparing the output signals of the recording time detector and the recording capacity time base data generator; and controlling a video tape recording speed in response to said video tape running mode signal.

* * * * *

UNITED STATES PATENT AND TRADEMARK OFFICE
CERTIFICATE OF CORRECTION

PATENT NO. : 5,117,316
DATED : May 26, 1992
INVENTOR(S) : Jeong-Ho KIM

Page 1 of 2

It is certified that error appears in the above-indentified patent and that said Letters Patent is hereby corrected as shown below:

IN THE ABSTRACT

Line 3, change "means" to --device--.

Column 1, Line 51, change "means" to --device--;

Column 2, Line 8, change "means" to --device--;
Line 33, change "too" to --to--;
Line 67, change "means" to --device--;

Column 3, Line 6, change "means" to --device--;
Line 21, change "means" to --device--;
Line 53, change "means" to --device--;

UNITED STATES PATENT AND TRADEMARK OFFICE
CERTIFICATE OF CORRECTION

PATENT NO. : 5,117,316
DATED : May 26, 1992
INVENTOR(S) : Jeong-Ho KIM

It is certified that error appears in the above-indentified patent and that said Letters Patent is hereby corrected as shown below:

Column 4,  Line 4,  change "means" to --device--;
            Line 14, change "a" to --an--;
            Line 21, change "minutes" to --minute--;
            Line 23, change "minutes" to --minute--;

Column 14, line 15, claim 15, delete "first means for";
           line 18, delete "second means for";
           line 32, insert --first and second-- after "the" (first occurrence) and change "of" to --for--;
           line 33, delete "detector" and delete "time base data"
           line 34, delete "generator".

Signed and Sealed this

Twenty-fourth Day of August, 1993

Attest:

BRUCE LEHMAN

Attesting Officer     Commissioner of Patents and Trademarks